Figure 1:
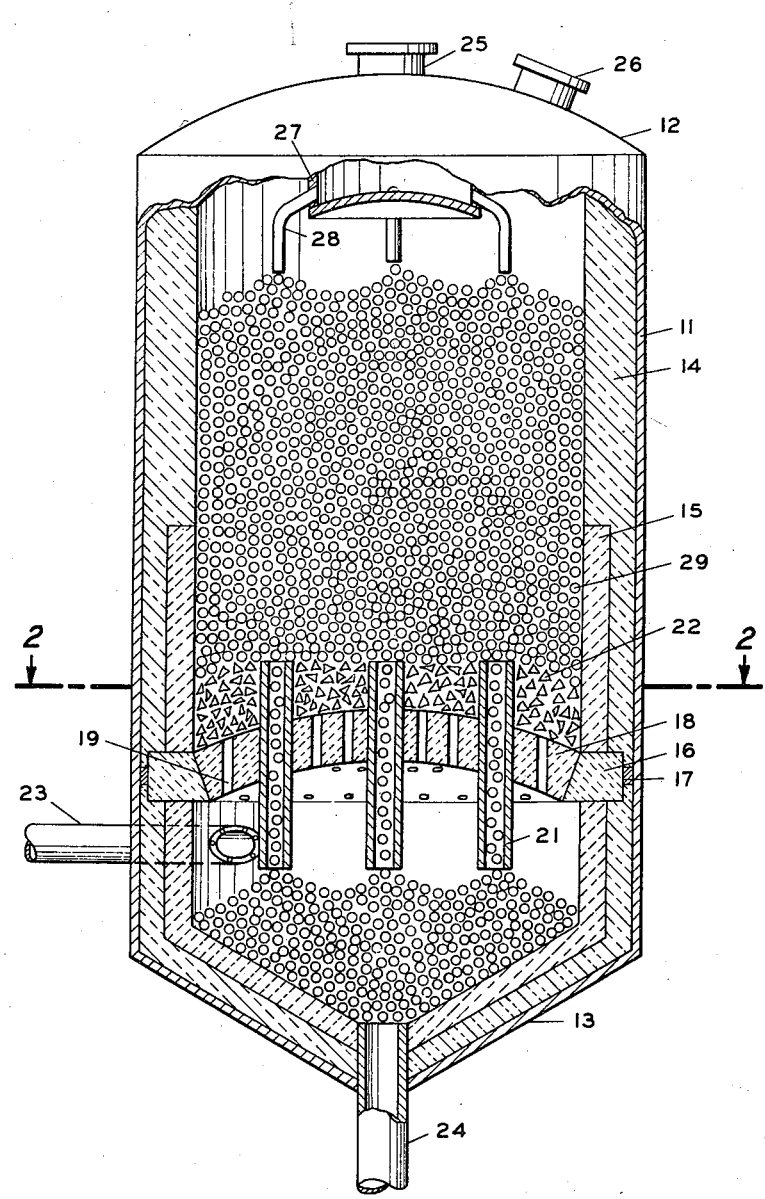

Jan. 16, 1951   S. P. ROBINSON   2,538,472
PEBBLE HEATING CHAMBER
Filed Jan. 2, 1948   3 Sheets-Sheet 1

INVENTOR.
S. P. ROBINSON
BY Hudson and Young
ATTORNEYS

Jan. 16, 1951 S. P. ROBINSON 2,538,472
PEBBLE HEATING CHAMBER
Filed Jan. 2, 1948 3 Sheets-Sheet 2

INVENTOR.
S.P. ROBINSON
BY *Hudson and Young*
ATTORNEYS

Patented Jan. 16, 1951

2,538,472

UNITED STATES PATENT OFFICE 2,538,472

PEBBLE HEATING CHAMBER

Sam P. Robinson, Bartlesville, Okla., assignor to Phillips Petroleum Company, a corporation of Delaware Application January 2, 1948, Serial No. 187

10 Claims. (Cl. 263—19)

This invention relates to pebble heater apparatus. In one of its more specific aspects, it relates to thermal conversion or treating apparatus. In another of its more specific aspects, it relates to pebble heating or regeneration chambers of pebble heater apparatus.

Thermal conversion processes carried on in so-called pebble heating apparatus utilize a flowing mass of pebbles which is heated to a high temperature in a first direct heat exchange step and is then caused to contact gaseous materials, furnishing heat thereto, in a second direct heat exchange. The conventional pebble heater apparatus comprises two chambers which may be disposed in substantially vertical alignment. Solid heat exchange material, such as refractory pebbles, is introduced into the upper portion of a first chamber. The solid heat exchange material flows downwardly through the chamber in direct heat exchange with a hot gaseous heat exchange material. The solid heat exchange material is heated to a high temperature in such heat exchange and is then passed to a second chamber in which it is caused to contact gaseous materials in a second direct heat exchange relation, furnishing heat to such materials.

Most conventional pebble heaters are provided with a combustion chamber adjacent or in close proximity to the sides of the lower portion of the first chamber. Hot combustion gas from the combustion chamber is injected through the sides of the first chamber, better known as a pebble heating chamber. Pebbles, which pass downwardly through the heating chamber, contact the rising combustion gas and are heated as above described. One disadvantage of such pebble heater apparatus is that pebbles near the periphery of the pebble bed in the heating chamber are heated to a higher temperature than those in the center of the downwardly flowing bed. This is due to the fact that a greater portion of the combustion gas tends to take the path of least resistance through the pebble bed. In most pebble heater apparatus, pebbles are introduced into the pebble heater chamber through a single opening in its top. Pebbles are withdrawn from a point substantially centrally located in the area of the heating chamber. As pebbles flow through the chamber they tend to form a cone, downwardly and outwardly from the pebble inlet, and the pebbles flowing out of the chamber tend to form an inverted cone downwardly and inwardly toward the pebble outlet. It will be seen that due to the cone shaped top and bottom of the bed, the area near the periphery of the bed is the thinnest and usually the point of least resistance for upwardly flowing gas. Gas tends to pass directly upwardly from the gas inlet, through the periphery of the bed and out of the effluent outlet in the top of the chamber. A portion of the pebble bed below the moving cone of pebbles is relatively stagnant. Once these pebbles in the stagnant area are heated they lose very little of their heat and thus receive very little heat from the gas passing upwardly therethrough. For that reason, gas leaving the heating chamber through the effluent outlet carries with it a considerable amount of heat which could have been imparted to cooler pebbles in the central portion of the pebble heater chamber.

Another disadvantage of the conventional type pebble heating chamber in which heating gas is injected through the side walls of the chamber is that when openings are made in the side walls of the chamber the walls are weakened thereby. In order to give the walls and insulating lining sufficient strength to support themselves, it is necessary to furnish heavier support means therefore around such openings.

In pebble heater chambers having single central pebble inlets and single central pebble outlets the ratio of chamber diameter to height affects, to a large extent, the flow pattern distribution of pebbles through the chamber. The higher the ratio of depth to diameter, the more uniform the flow and easier the control of pebble temperature. In commercial units pressure drop across the bed is likewise of great importance since all combustion air for heating must be compressed to force the combustion products through the pebble heating bed. The cost of compressing the combustion air above about 3.0 p. s. i. g. is uneconomical. For this reason single pebble inlet and outlet pebble heater chambers utilizing beds greater than 5 to 6 feet in depth are generally uneconomical. For uniform cross sectional area gravity flow of pebbles, a ratio of pebble bed depth to diameter of at least 1.5 to 1 and preferably 2.0 to 1 is desirable.

An object of the invention is to provide an improved chamber for heating pebbles in pebble heater apparatus. Another object is to provide an improved method for heating pebbles in pebble heater apparatus. Another object is to provide an improved combustion chamber for a pebble heater. Another object is to provide means for more evenly heating a given cross section of a flowing bed of pebbles in such a pebble heater chamber. Another object is to provide more even flow of pebbles through pebble heater chambers.

Another object is to provide improved means for tempering pebbles. Another object is to provide a strong compact pebble heater chamber. Another object is to provide a pebble bed having a substantially uniform depth. Other and further objects and advantages will be apparent to those skilled in the art on reference to the accompanying discussion, drawings and the claims.

The term "pebble," as used herein, denotes any solid refractory material of flowable form, size, and strength which is suitable to carry large amounts of heat from the pebble heating chamber to the gas heating chamber. Pebbles conventionally used in pebble heater apparatus are substantially spherical in shape and are from about one-eighth inch to about one inch in diameter. In high temperature processes, pebbles having a diameter of approximately three-eighths inch are preferred. The pebbles must be formed of a refractory material which will withstand temperatures at least as high as the highest temperature attained in the pebble heating chamber. The pebbles must also be capable of withstanding temperature changes within the apparatus. A refractory material, such as a metal or metal alloy, ceramic, or other satisfactory material may be utilized to form such pebbles. Satisfactory pebbles may be formed of silicon carbide, alumina, periclase, beryllia, stellite, zirconia, and mullite in admixture with each other or with other materials. Pebbles formed of such materials, when properly fired, serve very well in high temperatures, some withstanding temperatures up to about 3500° F. Pebbles which are inert or catalytic may be used in any selected process.

Figure 2:
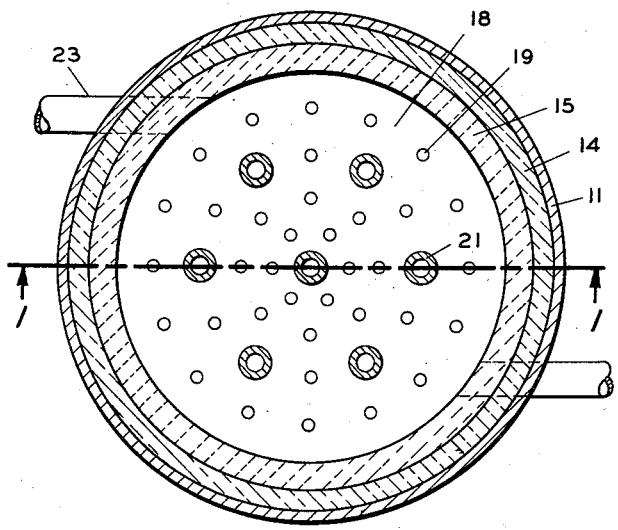
Figure 5:
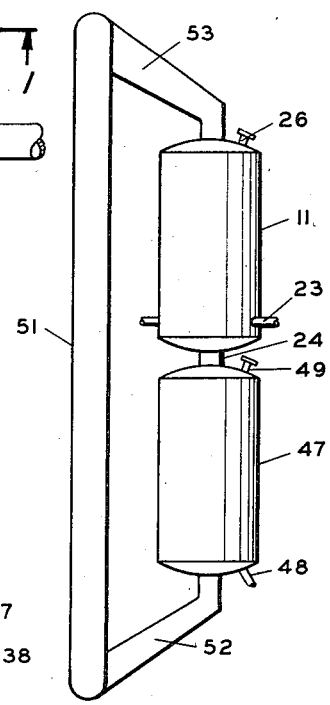
Figure 4:
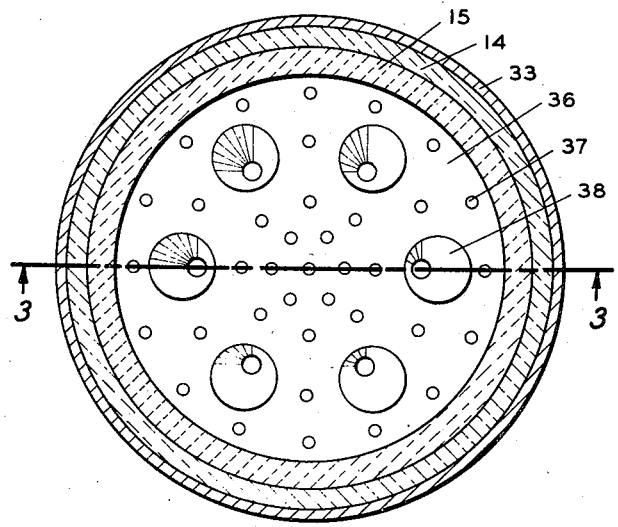
Figure 3:
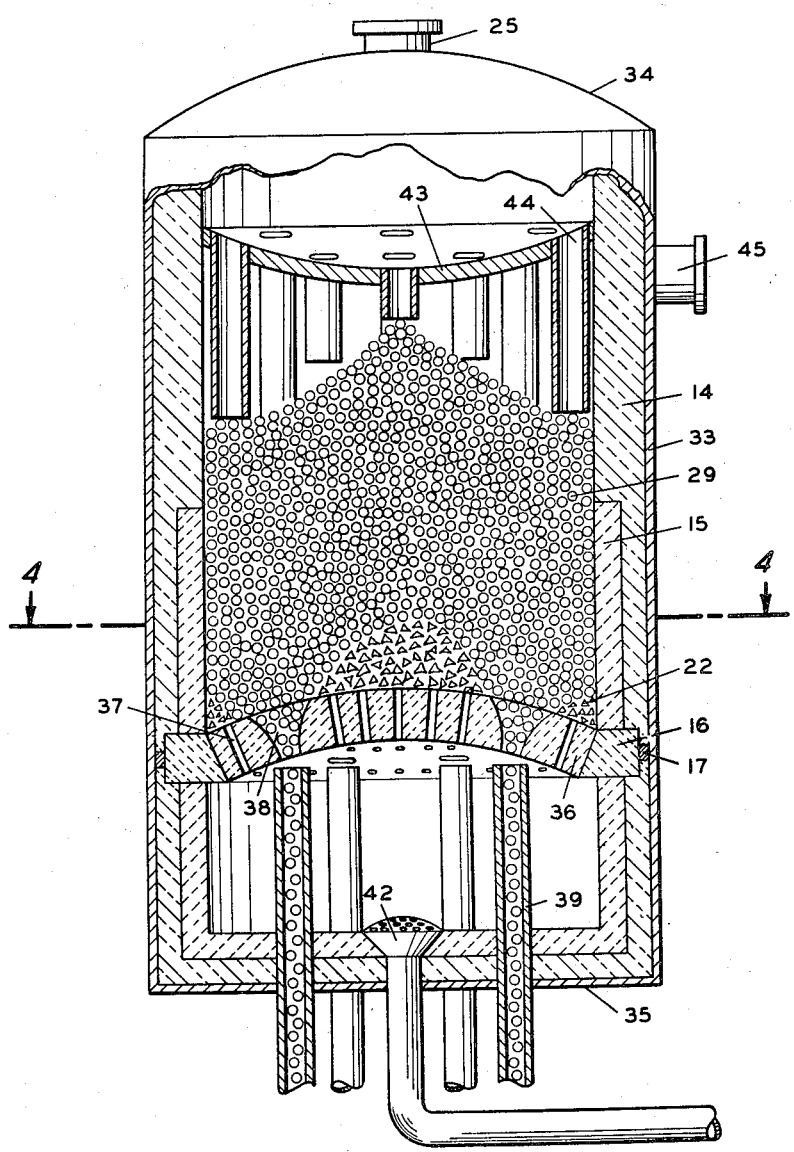

More complete understanding of the accompanying discussion and claims will be facilitated upon reference to the attached diagrammatic drawings in which Figure 1 is a vertical section of a pebble heater chamber embodying the preferred form of the invention. Figure 2 is a horizontal plan view taken along line 2—2 of Figure 1. Figure 3 is a vertical section of a pebble heater chamber embodying a modification of the invention. Figure 4 is a horizontal plan view taken along line 4—4 of Figure 3. Figure 5 is a schematic showing of a pebble heater apparatus.

In Figure 1, shell 11 is preferably an unbroken cylinder which is closed at its ends by closure members 12 and 13. Closure member 13 in the bottom of shell 11 is preferably conical in shape. Shell 11 is lined interiorly with layers of insulating materials, such as common refractory 14 and super-refractory material 15 which is backed by common refractory material or some other suitable insulation material. Common refractory materials 14 may include block insulation, insulating fire brick and fire clay fire brick or layers of any two or all of them. Super-refractory materials 15 may include silicon carbide, mullite, or alumina, or any other suitable refractory having physical and chemical properties which give sufficient strength to withstand heavy loads and high temperature without substantial breakage or deterioration. Silicon carbide may be satisfactorily used in operations utilizing temperatures up to about 2800° F. Mullite can be satisfactorily used with temperatures up to about 3000° F., and alumina may be satisfactorily used at temperatures up to about 3300° F. The above materials may be used at those temperatures, without substantial oxidation or reaction, with most conventionally used pebbles. Super-refractory material 15 is positioned so as to form an inner lining in the lower portion of shell 11. Layers of common refractory and super-refractory materials are also provided to insulate the bottom of said shell. Thrust blocks 16 are provided within the insulation lining and may also comprise super-refractory and common refractory materials. Thrust blocks 16 are tapered so that when fitted together they form a ring having an interior circumference which tapers downwardly and inwardly from its upper edge. The ring formed by thrust blocks 16 is supported about its outer circumference by locking ring 17 which prevents thrust blocks 16 from being forced outwardly by weight within the chamber. An opening may be provided in shell 11 for the purpose of tightening locking ring 17 about thrust blocks 16. A cover plate may be provided and secured to shell 11 over such an opening so as to make shell 11 an unbroken cylinder.

Convex load-supporting arch 18 is provided within shell 11 at a point intermediate the ends of the chamber contained within shell 11 and is supported upon the ring formed by thrust blocks 16. Arch 18 is preferably positioned in the lower portion of the chamber within shell 11 so as to provide a substantial space above said arch, as a pebble heating zone, while at the same time leaving a sufficient amount of space below the arch so as to form a combustion-pebble tempering zone. Arch 18 is provided with perforations 19 which extend upwardly through the arch and communicate between the combustion-pebble tempering zone and the pebble heating zone. Perforations 19 are provided in sufficient number and size so as to convey the desired amount of heating gas from the combustion-pebble tempering zone into the pebble heating zone. Pebble communication means provided for the passage of pebbles between the pebble heating zone and the combustion-pebble tempering zone comprises a plurality of pebble conduits 21 which extend upwardly through arch 18 for a short distance and downwardly from the arch for a short distance into a combustion-pebble tempering zone. Separation means, which may comprise a layer of aggregate material 22, is provided over the upper surface of arch 18 and separates the pebble bed from perforate portions of the arch. The aggregate material is preferably banked up around conduits 21 so as to add support to the conduit members. Conduits 21 must extend above the upper surface of arch 18 for a distance sufficient to extend through the layer of aggregate material 22. The distance which conduits 21 must extend into the combustion-pebble tempering zone must be such that a combustion space will be left between the plane reached by the lower ends of conduits 21 and the lower surface of arch 18. Heater means, which may comprise burners 23, are provided so as to extend through the walls of shell 11 and its insulation lining and preferably extend tangentially into the combustion space formed between the lower surface of arch 18 and the plane reached by the lower ends of conduits 21. The ends of conduits 21 must clear the bottom of the chamber formed within shell 11 a substantial distance so as to allow the formation of a pebble bed therebetween. Pebble outlet conduit 24 is provided in the lower portion of the chamber, preferably in the lowest portion of closure member 13. Pebble inlet means, such as conduit 25, is provided in the upper portion of the chamber and is preferably centrally positioned in closure member 12. Effluent outlet means, such as conduit 26, is provided in the upper portion of the chamber, preferably in closure member 12. Pebble distribution means comprising chamber 27 in the upper portion of the chamber formed within shell 11 and positioned below pebble inlet conduit 25 is provided with pebble outlet conduits 28 which radiate downwardly from chamber 27. Outlets 28 preferably extend so that their outlet ends are within imaginary chambers which are formed around an axis passing through conduits 21. The outlet ends of outlets 28 are preferably in substantially vertical alignment with conduits 21. The ends of outlets 28 preferably terminate substantially equidistantly from conduits 21 within the imaginary chambers. Pebbles 29 are provided in the form of a moving contiguous bed in the chamber formed within shell 11.

In Figure 3, shell 33 is preferably a substantially unbroken cylinder which is closed at its ends by closure members 34 and 35. Shell 33 is provided interiorly with a lining of insulation material, such as common refractory material 14 and super-refractory material 15 which is backed by a layer of common refractory material or some other suitable insulation material. The bottom of shell 33 is also protected by such an insulation lining. Thrust blocks 16 are assembled in the form of a ring in the insulation lining. The inner circumference of the ring formed by such thrust blocks tapers inwardly and downwardly from its upper inner periphery. The ring of thrust blocks 16 is supported on its outer circumference by locking ring 17. Refractory convex load-supporting arch 36 is provided so as to close the chamber formed within shell 33 at a point intermediate its ends, preferably in the lower portion of such chamber so as to form a combustion zone below said arch and a pebble heating zone above the arch. Arch 36 is provided with perforations 37 which extend upwardly through the arch and communicate between the combustion and pebble heating zones. Perforations 37 are of such size and number as may be necessary to deliver the desired amount of heating gas from the combustion zone to the pebble heating zone. Pebble outlet openings 38 are provided in arch 36 and are positioned in the arch intermediate its outer circumference and its axis. Pebble outlet means from the pebble heating zone may comprise pebble outlet openings in arch 36 and pebble conduits 39 which extend upwardly through closure 35 into the combustion zone to points immediately below the pebble openings. Heating means, such as burner 42, is provided in a combustion zone and preferably extends substantially vertically into the combustion zone. Such burner 42 may be a single wide-flared burner or a centrally dispersed cluster of burners. Pebble inlet means, such as conduit 25, is provided in the upper portion of shell 33 and is preferably centrally positioned in closure member 34. Closure member 43 is provided so as to close the upper portion of the chamber formed within shell 33 and so as to form a pebble surge chamber above the closure member 43 and maintain a pebble heating zone below such closure. Pebble openings 44 are provided in closure member 43 for the passage of pebbles between the pebble surge chamber and the pebble heating zone. Openings 44 are preferably conduits which extend from closure member 43 downwardly into the pebble heating zone. It is preferred that the conduits extend to such lengths that a contour passing through the ends of such conduits will be of substantially the same shape as the upper surface of arch 36. Effluent outlet 45 is provided in the upper portion of shell 33, preferably adjacent the lower edge of closure member 43. Aggregate material 22 forms a separation means over arch 36. Pebbles 29 are provided within the chamber formed within shell 33, over aggregate material 22 and arch 36, and form a contiguous moving bed therein.

In Figure 5, the pebble heater chamber contained within shell 11 is disposed substantially vertically above a gas heating chamber contained within shell 47. Conduit 24 communicates between the bottom of the chamber formed within shell 11 and the top of the chamber formed within shell 47. Burners 23 extend tangentially into a combustion-pebble tempering zone in the lower portion of shell 11. Effluent outlet 26 is provided in the upper portion of shell 11. Reactant material inlet means, such as conduit 48, is provided in the lower portion of shell 47. Effluent outlet means, such as conduit 49, is provided in the upper portion of shell 47. Pebble recycle means, such as elevator 51, communicates with the bottom of shell 47 by means of chute 52 and with the top of shell 11 by means of chute 53.

Though the pebble heater zone of the apparatus heretofore described has been described as being in one section, it is within the scope of this invention to separate the pebble heater zone into a plurality of sections by means of walls based upon the convex arch and extending upwardly through the chamber so as to form a plurality of pebble heater zones which would preferably be substantially coaxial with the outlets from said zones through the refractory arch. It is also within the scope of the invention to provide an addition to the pebble openings in the convex arch, as heretofore described, a plurality of additional pebble openings surrounding each of the initial openings which are used in the preferred form of the invention and the preferred modification above described.

In the operation of the apparatus shown in Figures 1, 3 and 5 of the drawings, pebbles made of any selected refractory material suitable for a process to be carried on within the apparatus are inserted into a pebble surge chamber through pebble inlet 25. The outlets from the pebble surge chamber form pebble distribution means and pebbles are passed into the pebble heating zone through the plurality of pebble conduits therefrom. The pebbles pass downwardly and cover the layer of aggregate material which covers the perforate sections of the refractory convex arch. A contiguous bed of pebbles is formed through the pebble heating chamber and the gas heating chamber. Gaseous combustible materials together with an oxygen-containing gas, which may be in excess of that needed to supply oxygen for the combustion of combustible materials, are injected into the heating zone beneath the convex arch through burners therein. In the apparatus shown in Figure 1, the combustible materials would be preferably inserted tangentially and in the device of Figure 3 would be inserted vertically. The combustible materials are burned in the combustion zone and combustion gases together with any excess oxygen pass upwardly through the perforate convex arch and through the pebble heating zone countercurrent to the flow of pebbles therein. In the device shown in Figure 1, the ends of the pebble conduits extending from the pebble surge chamber end on substantially the same horizontal plane and pebbles passing from those outlets tend to form a bed which when compared to the pebble bed in an apparatus utilizing a single pebble inlet is relatively flat. Aggregate material 22 which covers the perforate portions of the convex arch and which is packed around pebble conduits 21 forms a separation means which may have an upper surface or contour substantially the same as the contour of the top of the pebble bed. In the device of Figure 1, a contiguous mass of pebbles forms a pebble bed in the pebble heater chamber below the convex arch in which area the pebbles are tempered so that the heat through the pebbles is substantially constant. In the device of Figure 3, the pebble outlets from the pebble surge chamber are of such length that pebbles passing therefrom form a pebble bed, the top of which is of substantially the same contour as the upper surface of the convex arch. The aggregate material which covers perforate sections of the arch prevents the pebbles from falling through the perforations therein and direct the flow of pebbles into the plurality of pebble openings in the arch. Combustible materials are preferably introduced into the combustion zone of the apparatus of Figure 3 by means of vertically disposed burner 42. It is within the scope of the invention to utilize burners which are disposed perpendicularly, tangentially or vertically into the combustion chamber. The combustible materials together with the oxygen-containing gas which may be in excess of that necessary for the burning of the combustible materials are introduced into the combustion zone beneath the perforate convex arch where the combustible materials are burned. Combustion gases formed thereby together with any excess oxygen are passed upwardly through the perforate arch and countercurrent to the flow of pebbles in the pebble heating zone. Pebbles flow from the pebble heater chamber of Figure 3 through a plurality of pebble outlets 39 into a gas heating chamber therebelow while in the device of Figure 1 the pebbles are preferably passing into a gas heating chamber through a single communicating pebble conduit. It is within the scope of the invention to provide a plurality of communicating conduits to communicate between the bottom of the device of Figure 1 and a gas heating chamber. Pebbles passing downwardly from the pebble heating chamber shown in Figures 1, 3 and 5 pass downwardly through gas heating chambers and out a pebble outlet in the bottom portion thereof. Gaseous reactant materials are injected into the lower portion of the gas heating chamber and pass upwardly through the gas heating chamber countercurrently to the flow of the contiguous bed of pebbles. Effluent materials are removed from the upper portion of the gas heating chamber. Pebbles are removed from the bottom of a gas heating chamber and are recycled to the upper portion of the pebble heater chamber or the pebble surge chamber by pebble elevating means such as elevator 51.

Pebbles within the pebble heating zone tend to form stagnant zones of pebbles around the pebble outlet, the upper layer of the stagnant zone taking on an angle, known as the "angle of slip," 70° taken from a horizontal line passing through the inlet to the pebble outlet. It will be seen that by the devices of this invention utilizing the plurality of pebble outlets the space covered by the stagnant zones is substantially smaller than the space covered by stagnant zones in devices utilizing a single pebble outlet from the pebble heating zone. For this reason a substantially greater portion of the pebbles contained in the pebble heating zone are circulated in the pebble heater apparatus of this invention. Because of the increased circulation of pebbles greater amounts of heat will be removed from the pebble heating gas and the temperature of the effluent from the pebble heater chamber will be lowered thereby. By using the device of this invention greater economy is effected by reducing the waste heat. It will also be noted that by utilizing the plurality of pebble outlets from the pebble heating zone a flow of pebbles for any given cross section of any given pebble bed is much more even than in a chamber utilizing a single pebble outlet from a pebble heating zone. It is also apparent that a more uniform temperature will be established in the gas heating chamber by means of this structure.

In some instances, combustion gas may be carried from the pebble heating chamber into the gas heating chamber with the pebbles, or conversion products may rise from the gas heating chamber through the pebble conduits into the pebble heating zone. Such an occurrence would result in unstable conditions in either chamber. It is contemplated that if such a situation occurs fluid conduits may be provided so as to communicate with the pebble conduits which communicate between the pebble heater and gas heater chambers and a hot gas such as steam which is inert to the reaction may be passed into the pebble conduit as a choke means. The choke means would prevent other gases from passing through the pebble conduits.

*Examples*

A pebble heater chamber having a single pebble outlet is designed to heat 27 tons of ⅜ inch diameter pebbles per hour to a temperature of 1800° F. The chamber has a diameter of 7.5 feet and the pebble outlet throat has an inner diameter of 7 inches. The angle of slip intersects the wall of the pebble heater chamber on a line 10.3 feet above the horizontal passing through the inlet to the pebble outlet. Thus, with a pebble bed depth of 10.3 feet or less some of the heating gas passes through only stagnant portions of the pebble bed and escape without entering into a heat exchange relation with the moving pebbles. Using a pebble bed depth of only 5 feet in this chamber allows the escape of over 75 per cent of the heating gas which totally fails to enter into a heat exchange relation with the moving pebbles. That gas which does enter into such a heat exchange with the flowing pebbles averages only 1.67 feet despite the bed depth of 5 feet. When the pebble bed depth is increased to 10 feet, over 3 per cent of the gas fails to enter into a heat exchange with the moving pebbles. The gas which does enter into the heat exchange has an average contact depth of 3.33 feet. With a pebble bed depth of 10 feet, at least 65 per cent of the bed is wasted. With a pebble bed depth of 5 feet over 90 per cent of the bed is wasted.

A similar pebble heater chamber is provided with 5 pebble outlets which are 3.5 inches in diameter. The outlets are symmetrically disposed on a circle the diameter of which is ⅔ that of the chamber. Funnels of flowing pebbles are tangent at a height of 4 feet and are completely merged at a height of 6.25 feet, taken from a plane passing through the inlet to the pebble outlets. At a pebble bed depth of 5 feet less than 12 per cent of the heating gas fails to enter into a heat exchange relation with the moving portion of the pebble bed and the 88 per cent which does enter into the heat exchange has an average contact depth of 2 feet. With a bed depth of 10 feet all of the heating gas enters into the heat exchange for a contact depth of at least 3.75 feet and an average contact depth of 7 feet. In this chamber a pebble bed depth of 10 feet about 30 per cent of the bed is wasted and with a 5 foot bed depth about 61 per cent of the bed depth is wasted.

A third chamber of the size of the first and second chambers is provided with 8 pebble outlets symmetrically disposed on a circle the diameter of which is ¾ that of the chamber. A ninth outlet is centrally located in the chamber. The outlets are 2.625 inches in diameter. In this chamber the funnels of flowing pebbles are completely merged at a bed depth of 4.5 feet and are tangent at a depth of 4 feet. At a bed depth of 5 feet all of the heating gas enters into a heat exchange relation with the moving pebbles and has an average contact depth of 2.75 feet. At a bed depth of 10 feet the gas contacts at least 5.625 feet of moving pebbles with an average contact depth of 7.75 feet. This chamber with a bed depth of 10 feet allows a waste of about 25 per cent of the bed space and with a 5 foot bed depth has a waste space of about 50 per cent.

The pebble diameter used in each of these chambers is ⅜ inch. The pebbles are directed into the chamber so as to form a relatively flat topped pebble bed. Comparison of the three examples indicates that the chambers utilizing the plurality of pebble outlets is the most economical in the use of space and heating gas.

As will be evident to those skilled in the art, various modifications of this invention can be made or followed in the light of the foregoing disclosure, discussion and example without departing from the spirit or scope of the disclosure or from the scope of the claims.

I claim:

1. In pebble heater apparatus utilizing a moving bed of heated pebbles, an improved pebble heater chamber comprising an upright closed outer shell; insulating means within and adapted so as to insulate said shell; pebble inlet means in the upper portion of said shell; pebble distribution means in the upper portion of the chamber formed within said shell; effluent outlet means in the upper portion of said shell; a perforate convex load-supporting arch closing said chamber intermediate its bottom and said pebble distributing means; first pebble outlet conduit means extending through and spaced apart over said arch; second pebble outlet conduit means below said arch, vertically separated from said first pebble outlet means and extending through the bottom of said shell; and heater means within said chamber and below said arch.

2. The pebble heater chamber of claim 1, wherein said chamber is provided with separation means covering perforate portions of said arch.

3. In pebble heater apparatus utilizing a moving bed of heated pebbles, an improved pebble heater chamber comprising a substantially vertically disposed closed outer shell; insulating means within and adapted so as to insulate said shell; pebble inlet means in the upper portion of said shell; pebble distribution means comprising a closure member in the upper portion of the chamber formed within said shell closing off a pebble surge chamber above said closure member and a pebble heating zone below said member, and pebble openings in said closure member communicating between said surge chamber and said pebble heating zone; effluent outlet means in the upper portion of said shell below said closure member; a perforate convex load-supporting arch closing said chamber intermediate its bottom and said distribution means; pebble outlet means comprising a plurality of pebble outlet openings spaced apart and disposed in said arch and pebble conduit members extending upwardly through the bottom of said shell to points immediately below and vertically spaced apart from said pebble openings in said arch; and heater means within said chamber and below said arch.

4. The pebble heater chamber of claim 3, wherein said pebble openings in said closure member comprise a plurality of conduits extending downwardly therefrom into said pebble heating zone, those conduits nearer the periphery of said closure extending to points below the level to which those conduits closer to the axis of said closure member extend.

5. The pebble heater chamber of claim 3, wherein said pebble distribution means comprises a concave closure member having a plurality of conduits extending downwardly therefrom into said pebble heating zone, those conduits nearer the periphery of said closure extending downwardly therefrom into said pebble heating zone to points below the level to which those conduits closer to the axis of said closure member extend.

6. The pebble heater chamber of claim 3, wherein said pebble distribution means comprises a concave closure member having a plurality of conduits extending downwardly therefrom into said pebble heating zone, those conduits nearer the periphery of said closure extending downwardly therefrom into said pebble heating zone to points below the level to which those conduits closer to the axis of said closure member extend; and said burner means comprises at least one burner extending substantially vertically through the bottom of said shell into the chamber portion below said arch.

7. In pebble heater apparatus utilizing a contiguous moving bed of heated pebbles, an improved pebble heating chamber comprising a substantially vertically disposed closed outer shell; insulating means within and adapted so as to insulate said shell; pebble inlet means in the upper portion of said shell; pebble distribution means comprising a closure member in the upper portion of the chamber formed within said shell closing off a pebble surge chamber above said closure member and a pebble heating zone below said member, and pebble openings in said closure member communicating between said surge chamber and said pebble heating zone; effluent outlet means in the upper portion of said shell below said closure member; a perforate convex load-supporting arch closing said chamber intermediate its bottom and said distribution means; separation means adapted so as to separate said pebble bed from perforate portions of said arch; pebble outlet means comprising pebble outlet openings spaced apart and disposed in said arch and pebble conduit members extending upwardly through the bottom of said shell to points immediately below and vertically spaced apart from said pebble openings in said arch; and heater means within said chamber and below said arch.

8. In pebble heater apparatus utilizing a moving bed of heated pebbles, an improved pebble heating chamber comprising a substantially vertically disposed closed outer shell; insulating means within and adapted so as to insulate said shell; pebble inlet means in the upper portion of said shell; pebble distribution means comprising a chamber below said pebble inlet means and a plurality of pebble conduits radiating downwardly therefrom within the upper portion of the chamber formed within said shell; effluent outlet means in the upper portion of said shell; a perforate convex load-supporting arch closing said chamber intermediate its bottom and said distribution means forming a pebble heating zone above said arch and a combustion-pebble tempering zone therebelow; pebble communication means, communicating between said pebble heating zone and said combustion-pebble tempering zone comprising a plurality of pebble conduits spaced apart and extending substantially vertically upwardly from points within said combustion-pebble tempering zone through said arch a distance into said pebble heating zone; heater means extending into the upper portion of said combustion-pebble tempering zone; and pebble outlet means extending downwardly from the bottom of said combustion-pebble tempering zone through the bottom of the said shell.

9. In pebble heater apparatus utilizing a moving bed of heated pebbles, an improved pebble heating chamber comprising a substantially vertically disposed closed outer shell; insulating means within and adapted so as to insulate said shell; pebble inlet means in the upper portion of said shell; pebble distribution means comprising a chamber below said pebble inlet means and a plurality of pebble conduits radiating downwardly therefrom within the upper portion of the chamber formed within said shell; effluent outlet means in the upper portion of said shell and above the level of the outlets of said conduits; a perforate convex load-supporting arch closing said chamber intermediate its bottom and said distribution means forming a pebble heating zone above said arch and a combustion-pebble tempering zone therebelow; separation means adapted so as to separate said pebble bed from perforate portions of said arch; pebble communication means communicating between said pebble heating zone and said combustion-pebble tempering zone comprising a plurality of pebble conduits spaced apart and extending substantially vertically upwardly from points intermediate the ends of said combustion-pebble tempering zone through said arch and at least through the upper surface of said separation means; heater means extending into the upper portion of said combustion-pebble tempering zone; and pebble outlet means extending downwardly from the bottom of said combustion-pebble tempering zone through the bottom of said shell.

10. The pebble heater chamber of claim 9 wherein said heater means is a plurality of tangentially positioned burners which extend into said combustion-pebble tempering zone to points above the outlet ends of said conduits of said pebble communication means.

SAM P. ROBINSON.

REFERENCES CITED

The following references are of record in the file of this patent:

UNITED STATES PATENTS

| Number | Name | Date |
| --- | --- | --- |
| 2,386,670 | Evans | Oct. 9, 1945 |
| 2,399,450 | Ramseyer | Apr. 30, 1946 |
| 2,412,136 | Evans et al. | Dec. 3, 1946 |
| 2,445,554 | Bergstrom | July 20, 1948 |
| 2,446,805 | Bergstrom | Aug. 10, 1948 |